(12) United States Patent
Savino et al.

(10) Patent No.: US 7,504,523 B2
(45) Date of Patent: Mar. 17, 2009

(54) URETONIMINE-MODIFIED ISOCYANATE COMPOSITION AND METHOD OF FORMING THE SAME

(75) Inventors: Thomas Savino, Northville, MI (US); Sandra Bananto, Dearborn, MI (US)

(73) Assignee: BASF Corporation, Florham Park, NJ (US)

( * ) Notice: Subject to any disclaimer, the term of this patent is extended or adjusted under 35 U.S.C. 154(b) by 531 days.

(21) Appl. No.: 11/276,702

(22) Filed: Mar. 10, 2006

(65) Prior Publication Data

US 2007/0213496 A1 Sep. 13, 2007

(51) Int. Cl.
C08G 2/06 (2006.01)
(52) U.S. Cl. ...................................... 548/952; 540/200
(58) Field of Classification Search ................... 528/59, 528/44, 48, 67, 589; 252/182.2; 548/951, 548/952; 540/200
See application file for complete search history.

(56) References Cited

U.S. PATENT DOCUMENTS

| | | | |
|---|---|---|---|
| 3,260,702 A | 7/1966 | Murakami et al. | |
| 3,281,446 A | 10/1966 | Manning | |
| 3,330,849 A | 7/1967 | Ulrich | |
| 3,960,950 A | 6/1976 | Hansen | |
| 3,970,680 A | 7/1976 | Holland | |
| 4,072,712 A | 2/1978 | Meisert et al. | |
| 4,120,884 A | 10/1978 | Woerner et al. | |
| 4,177,205 A | 12/1979 | Schaaf et al. | |
| 4,199,524 A | 4/1980 | Schaaf et al. | |
| 4,260,554 A * | 4/1981 | Ohlinger et al. | 560/331 |
| 4,340,533 A | 7/1982 | Rody | |
| 4,487,964 A | 12/1984 | Watson, Jr. et al. | |
| 4,587,301 A | 5/1986 | Watson, Jr. et al. | |
| 4,625,052 A | 11/1986 | Konig et al. | |
| 4,677,154 A | 6/1987 | Narayan et al. | |
| 4,677,221 A | 6/1987 | Muller et al. | |
| 4,743,626 A | 5/1988 | Narayan | |
| 5,070,137 A | 12/1991 | Kase et al. | |
| 5,117,059 A | 5/1992 | Tylor | |
| 5,352,400 A | 10/1994 | West | |
| 5,354,888 A | 10/1994 | Scholl | |
| 5,357,021 A | 10/1994 | Tye et al. | |
| 5,359,129 A | 10/1994 | Shimizu et al. | |
| 5,504,241 A | 4/1996 | Pohl et al. | |
| 2005/0032947 A1 | 2/2005 | Takahashi et al. | |
| 2006/0025557 A1 * | 2/2006 | Wershofen et al. | 528/44 |

FOREIGN PATENT DOCUMENTS

| | | |
|---|---|---|
| EP | 0 351 873 A2 | 1/1990 |
| EP | 0 538 500 A1 | 4/1993 |
| EP | 1 514 897 A1 | 3/2005 |
| JP | 08067662 A | 12/1996 |

OTHER PUBLICATIONS

"Hindered Amino Ethers: A New Class of Radical Scavengers for Coatings" Proceedings of the Water-Borne and Higher-Solids Coatings Symposium (1990), 17th pp. 240-261.
"Mechanisms of Thermooxidative Stabilization With Has" Gugumus, F. Ciba-Geigy AG, Basel, Switz. Polymer Degradation and Stability (1994), 44(3), pp. 299-322.
"Stabilization Mechanisms of Hindered Amines" Klemchuk, Peter P.; Gande, Matthew E. Ciba-Geigy Corp., Ardsley, NY, USA. Polymer Degradation and Stability (1988), 22(3), pp. 241-274.
Photooxidation of Fire Retarded Polypropylene. III. Mechanism of Has Inactivation. Sinturel, Christophe; Lemaire, Jacques; Gardette, Jean-Luc. Laboratoire de Photochimie Moleculaire et Macromoleculaire UMR CNRS 6505, Universite Blaise Pascal et ENS de Chimie de Clermont-Ferrand, Aubiere, Fr. European Polymer Journal (2000), 36(7), pp. 1431-1443.
"Synthesis and Thermal Stability of Alkoxyamines" Polymer Degradation and Stability 55 (1997) pp. 323-327.

* cited by examiner

*Primary Examiner*—David R Sample
*Assistant Examiner*—Michael Leonard

(57) ABSTRACT

A uretonimine-modified isocyanate composition has reduced color. The uretonimine-modified isocyanate composition comprises a polyisocyanate composition having two or more isocyanate groups and comprising 4,4'-diphenylmethane diisocyanate (MDI) and a catalyst for catalyzing a reaction of the isocyanate groups to form carbodiimides available for forming uretonimines and uretonimine oligomers. A first quenching agent partially quenches the reaction of the isocyanate groups to inhibit formation of the carbodiimides thereby inhibiting additional formation of uretonimines and uretonimine oligomers and a second quenching agent different than the first quenching agent quenches the reaction of the isocyanate groups to further inhibit formation of the carbodiimides thereby further inhibiting additional formation of uretonimines and uretonimine oligomers. A method of forming the uretonimine-modified isocyanate composition is also disclosed.

15 Claims, No Drawings

URETONIMINE-MODIFIED ISOCYANATE COMPOSITION AND METHOD OF FORMING THE SAME

BACKGROUND OF THE INVENTION

1. Field of the Invention

The subject invention relates to a uretonimine-modified isocyanate composition and method of forming the same. More specifically, the subject invention relates to a uretonimine-modified isocyanate composition having reduced color and a method of forming the uretonimine-modified isocyanate composition having the reduced color.

2. Description of the Related Art

Various uretonimine-modified isocyanate compositions, also known as carbodiimide-modified isocyanate compositions, are known. These compositions generally comprise a polyisocyanate composition having two or more isocyanate groups and comprising 4,4'-diphenylmethane diisocyanate (MDI) and a catalyst for catalyzing a reaction of the isocyanate groups to form carbodiimides. The carbodiimides then react with available isocyanate groups to form uretonimines that undergo further reaction to form uretonimine oligomers. Once the reaction has achieved a desired level, generally based upon a percent NCO groups remaining, a quenching agent is added to quench the catalyst used to promote the reaction of the isocyanate groups, thus inhibiting the formation of additional carbodiimides thereby inhibiting additional formation of uretonimine and uretonimine oligomers. Examples of quenching agents that have been employed include strong acids, such as trifluoromethane sulfonic acid or perchloric acid in U.S. Pat. No. 4,260,554. Other examples include weaker acids, such as Lewis acids, aromatic carboxylic acid halides, aromatic sulfonic acid esters and the like in U.S. Pat. No. 4,120,884.

Generally, it has been known to quench the reaction with a very strong acid to prevent, inhibit, or retard continued reaction of the isocyanate groups over time and to prevent the continued formation of carbodiimide and uretonimine oligomers. However, the addition of the strong acid results in the uretonimine-modified composition becoming colored, typically yellow, orange, or brown. Any isocyanate products or articles formed from the colored uretonimine-modified composition generally have the same color. Therefore, the articles may require additional processing to disguise the color or additional amounts of pigment are necessary to overcome the prior color of the uretonimine-modified composition.

The weaker acids, while affording lower color uretonimine-modified compositions, generally do not adequately deactivate the catalyst. Therefore, the stability of the composition is undesirable and the composition must be used within a shorter period of time. If the composition is used after the stability of the composition has been compromised, then articles formed therefrom are susceptible to being rejected as non-conforming.

Accordingly, it would be advantageous to provide a composition that overcomes the inadequacies that characterize the related art.

SUMMARY OF THE INVENTION

The subject invention provides a uretonimine-modified isocyanate composition having reduced color and a method of forming the same. The uretonimine-modified isocyanate composition comprises a polyisocyanate composition having two or more isocyanate groups and comprising 4,4'-diphenylmethane diisocyanate (MDI) and a catalyst for catalyzing a reaction of the isocyanate groups to form carbodiimides that undergo further reaction to form uretonimine oligomers. A first quenching agent partially quenches the reaction of the isocyanate groups to inhibit formation of the carbodiimides, uretonimines and uretonimine oligomers and a second quenching agent different than the first quenching agent quenches the reaction of the isocyanate groups to further inhibit formation of the carbodiimides, uretonimines and uretonimine oligomers and provide a storage stable composition.

Formation of the uretonimine-modified composition according to the subject invention results in the composition having reduced color and exhibiting good storage stability. As compared to related art processes and composition, the uretonimine-modified isocyanate composition can be used to produce articles that have little color. Thus, lower amounts of pigments, if any at all, will be needed to produce colored articles or to disguise the coloration of the uretonimine-modified isocyanate composition. Additionally, the composition of the subject invention performs adequately in stability testing and outperforms commercially available uretonimine-modified isocyanate compositions.

DETAILED DESCRIPTION OF THE INVENTION

A method of producing a uretonimine-modified isocyanate composition is disclosed. The method of producing the uretonimine-modified isocyanate composition includes the step of providing a polyisocyanate composition having two or more isocyanate groups and comprising 4,4'-diphenylmethane diisocyanate (MDI). It is known that 4,4'-MDI is also referred to as bis(4-isocyanatophenyl)methane or 4,4'-methylenediphenyl diisocyanate. As used herein, the terms "isocyanate composition" and "composition" are intended to refer to the uretonimine-modified isocyanate composition.

The 4,4'-MDI is present in an amount of from about 1 to less than 99.5 parts by weight based on 100 parts by weight of the polyisocyanate composition. Preferably, the 4,4'-MDI is present in an amount of from about 35 to about 98 parts by weight, and more preferably from about 50 to about 98 parts by weight, both based on 100 parts by weight of the polyisocyanate composition. It is to be appreciated that different amounts of the 4,4'-MDI will generally produce different types of uretonimine-modified isocyanate compositions. The 4,4'-MDI can be produced by any of the commonly employed processes including the distillation of crude mixtures of isocyanate obtained by phosgenating a mixture of polyamines generally obtained by acid condensation of aniline and formaldehyde.

Generally, in addition to the 4,4'-MDI, the polyisocyanate composition may also comprise 2,4'-MDI, 2,2'-MDI, and other isomers. The 2,4'-MDI and the 2,2'-MDI isomers are less reactive than the 4,4'-MDI and when combined with 4,4'-MDI in certain ratios afford compositions that are liquids at room temperature. It has previously been known to add small amounts of either the 2,4'-MDI and the 2,2'-MDI to the 4,4'-MDI to improve the stability of the polyisocyanate composition. For example, commercially pure 4,4'-MDI has about 98 parts by weight 4,4'-MDI and up to 2 parts by weight 2,4'-MDI. The subject invention provides the 2,4'-MDI present in an amount of greater than 0.5 to about 60 parts by weight based on 100 parts by weight of the polyisocyanate composition. Preferably, the 2,4'-MDI is present in an amount of from about 1 to about 50 parts by weight, and more preferably, from about 2 to about 40 parts by weight, both based on 100 parts by weight of the polyisocyanate composition To form the uretonimine-modified isocyanate composition, the polyisocyanate composition is reacted at a temperature of greater than about 80° C., preferably from about 80° C. to about 130° C., and more preferably from about 100° C. to about 120° C. The temperature of the polyisocyanate composition may be raised using standard techniques, such as heat baths, ovens, burners, etc.

The polyisocyanate composition is also reacted in the presence of a catalyst such that the isocyanate groups of MDI react to first form carbodiimides. The catalyst is present in amounts of from about 2 to about 500 parts per million. The amount of catalyst depends on the reaction temperature such that the reaction temperature remains near the desired reaction temperature and that the reaction occurs in a desired amount of time. Preferably, the catalyst is present in an amount of from about 5 to about 100 parts per million. As appreciated by those of ordinary skill in the art, the catalyst may participate in the reaction and may also remain in the uretonimine-modified isocyanate composition. Alternatively, the catalyst may be removed or filtered. The catalyst catalyzes the formation of the carbodiimides and does not substantially interact with the reaction of the carbodiimides and the polyisocyanate composition or the uretonimines.

The uretonimine-modified compositions of the present invention may be prepared using any of the known carbodiimide-promoting compounds as the catalyst. The catalyst is selected from at least one of phospholene, phospholene oxide, phospholidine, phospholidine oxide, phosphate esters, and phosphine oxides. One example of a phospholidine includes 1-phenyl phospholidine and one example of a phospholidine oxide includes 1-phenyl-phospholidine-1-oxide. Other suitable catalysts include phosphate esters, such as triethylphosphate, and phosphine oxides, such as tributylphosphine oxide.

Preferred catalysts are phospholene oxides, and most preferred are phospholene 1-oxides having the following formula:

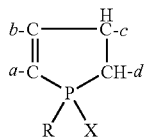

Or the isomeric formula

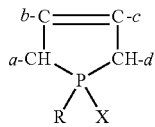

wherein a, b, c and d are each selected from one of hydrogen or hydrocarbyl from 1 to 12 carbon atoms inclusive, R is selected from one of lower alkyl or aryl and X is selected from one of oxygen or sulfur.

Representative compounds within this class of catalysts are 3-methyl-1-phenyl-3-phospholene-1-oxide, 3-methyl-1-phenyl-2-phospholene-1-oxide, 1-methyl-3-phospholene-1-oxide, 1-methyl-2-phospholene-1-oxide, 1-ethyl-3-phospholene-1-oxide, 1-ethyl-2-phospholene-1-oxide 1-phenyl-3-phospolene-1-oxide, and 1-phenyl-2-phospolene-1-oxide. Also, polymer bound catalysts, and especially polymer bound phospholene oxides, may be employed in the subject invention.

In addition, co-catalysts may also be used to ensure the desired reaction temperature and time. The co-catalyst is added in an amount of from about 50 to about 1500 parts per million, preferably from about 100 to about 1250, more preferably from about 200 to about 1000 parts per million. The co-catalyst is preferably a phosphite, comprised of aliphatic, aromatic, or mixed aliphatic and aromatic groups. Examples of preferred co-catalysts include triphenyl phosphite, tributyl phosphite, phenyl diisodecyl phosphite, and diphenyl isodecyl phosphite.

In addition, hindered phenol antioxidants, and especially 2,6-di-tert-butyl-hindered phenolic antioxidants, may be present in the polyisocyanate composition. Examples of phenolic antioxidants include 2,6-di-tert-butyl-4methylphenol, also known as BHT, and 3-(3,5-di-tert-butyl-4-hydroxyphenyl)propanoate, available commercially as Irganox® 1076. Hindered phenolic antioxidants are commonly used as stabilizers for commercial polyisocyanate compositions, and thus may be present when employed in forming the uretonimine-modified isocyanate composition of the subject invention. If the hindered phenolic antioxidants are not present in the polyisocyanate composition, then they may also be added before or after the reaction to form carbodiimide, uretonimine, and uretonimine oligomers.

It is to be appreciated by those of ordinary skill in the art that only a portion of the isocyanate groups may react to form the carbodiimides, however, all isocyanate groups may react. The carbodiimides can then react further with the isocyanate groups of unreacted MDI to form uretonimine and uretonimine oligomers.

Alternatively, the carbodiimide may also react with the isocyanate group of another molecule of uretonimine instead of unreacted MDI, to form a higher molecular weight, oligomeric uretonimine. For clarity, the term "uretonimine" is intended to mean 3-functional, six ring uretonimine oligomer because there is a single uretonimine group, as shown below. Additionally, "uretonimine oligomers" is intended to mean more than 3 functional groups, which have more than a single uretonimine group, as shown below.

The MDI forms uretonimines and uretonimine oligomers as a result of the reaction. In addition to reacting with MDI, other mono-, di-, tri-, tetra-isocyanates and other aromatic, aliphatic, and cycloaliphatic polyisocyanates and combinations thereof may react with the MDI. Examples of suitable monoisocyanates include phenyl isocyanates and cyclohexyl isocyanate. Examples of suitable diisocyanates include m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), isophorone diisocyanate, hydrogenated diphenylmethane diisocyanate, naphthalene-1,5 diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-diphenylmethane4,4'-diisocyanate, and tetramethylxylylene diisocyanate. Examples of suitable triisocyanates include 4,4',4"-triphenylmethane triisocyanate and toluene 2,4,6-triisocyanate. Examples of suitable tetraisocyanates include 4,4'-dimethyldiphenylmethane-2,2',5,5'-tetraisocyanate and examples of suitable polymeric polyisocyanates include polymethylene polyphenylene polyisocyanate.

The uretonimines formed in the reaction are a mixture of oligomers, including 3-functional, six ring uretonimine, 4-functional, ten ring uretonimine, and 5-functional, fourteen ring uretonimine. One possible reaction of the 4,4'-MDI while in the presence of the catalyst is shown below, which results in the formation of the 3-functional, six ring oligomer, 1,3-bis(4-(4-isocyanatobenzyl)phenyl)-4-(4-(4-isocyanatobenzyl)phenylimino)-1,3-diazetidin-2-one. The first step in this reaction is the formation of a carbodiimide intermediate, N,N'-methanediylidenebis-4-(4-isocyanatobenzyl)aniline from two molecules of 4,4-MDI. The carbodiimide may react further with another molecule of 4,4'-MDI to form a 3-functional, six ring uretonimine.

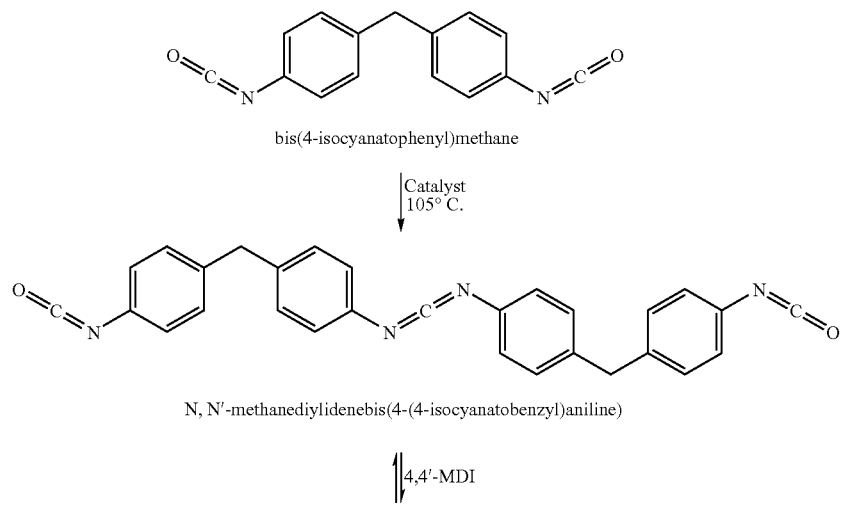
bis(4-isocyanatophenyl)methane
N,N'-methanediylidenebis(4-(4-isocyanatobenzyl)aniline)
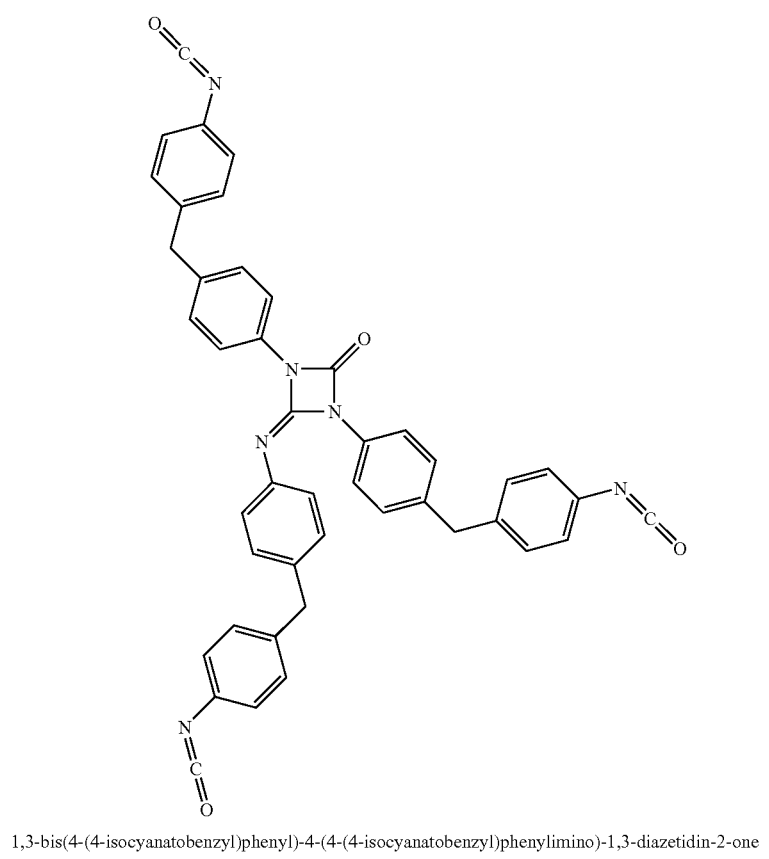
1,3-bis(4-(4-isocyanatobenzyl)phenyl)-4-(4-(4-isocyanatobenzyl)phenylimino)-1,3-diazetidin-2-one Below is an example of the 4-functional, ten ring uretonimine oligomer that may be formed as a result of the 3-functional uretonimine oligomer reacting with the carbodiimide of 4,4'-MDI.

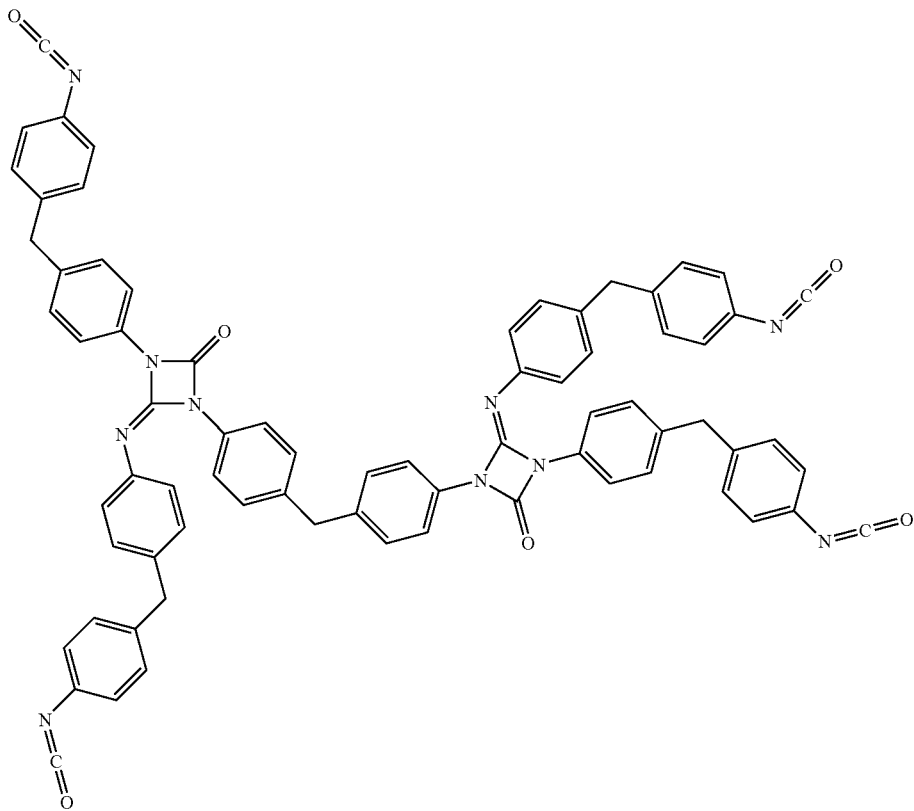

1-(4-(4-isocyanatobenzyl)phenyl)-3-(4-(4-(3-(4-(4-isocyanatobenzyl)phenyl)-2-(4-(4-isocyanatobenzyl)phenylimino)-4-oxo-1,3-diazetidin-1-yl)benzyl)phenyl)-4-(4-(4-isocyanatobenzyl)phenylimino)-1,3-diazetidin-2-one

40

Below is an example of the 5-functional, fourteen ring uretonimine oligomer that may be formed as a result of the 4-functional uretonimine oligomer reacting with the carbodiimide of 4,4'-MDI.

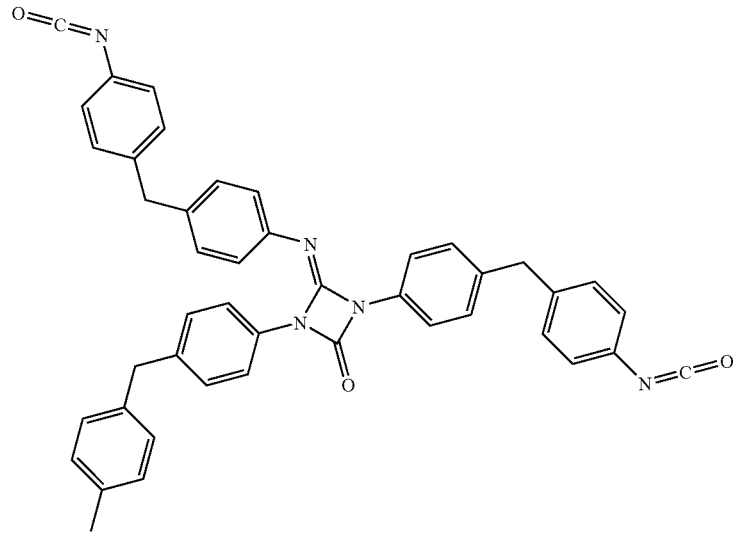

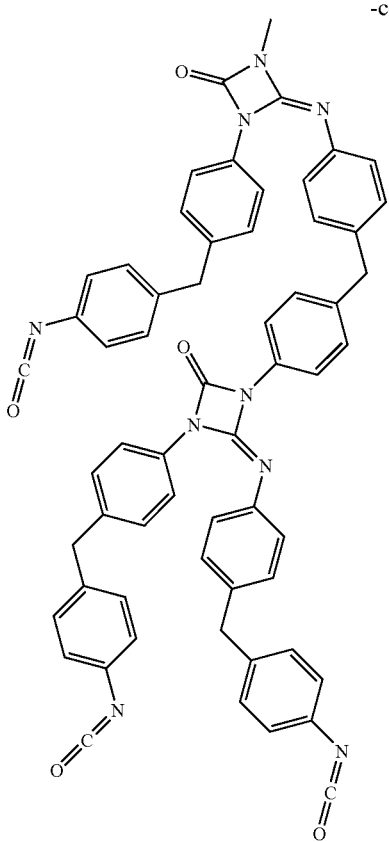

1-(4-(4-isocyanatobenzyl)phenyl)-3-(4-(4-(3-(4-(4-isocyanatobenzyl)phenyl)-2-(4-(4-(3-(4-(4-isocyanatobenzyl)phenyl)-2-(4-(4-isocyanatobenzyl)phenylimino)-4-oxo-1,3-diazetidin-1-yl)benzyl)phenylimino)-4-oxo-1,3-diazetidin-1-yl)benzyl)phenyl)-4-(4-(4-isocyanatobenzyl)phenylimino)-1,3-diazetidin-2-one The longer the reaction proceeds, the larger the amount of the higher-functional uretonimine oligomers, i.e., greater than 3-functional, that is formed. As more MDI is consumed and converted to uretonimines, the isocyanate value of the polyisocyanate composition is reduced because reactive isocyanate groups are reacted with one another. As understood by those of ordinary skill in the art, the isocyanate value refers to a weight percentage of reactive isocyanate groups in the polyisocyanate composition. The isocyanate value can be determined by the following, well-known equation:

$$\text{Isocyanate Value} = \%\ NCO\ \text{groups} = \frac{42 \times f}{Mw} \times 100,$$

wherein 42 is the molecular weight of the NCO groups, f is functionality and refers to the number of reactive groups in the polyisocyanate composition, and Mw is the molecular weight of the polyisocyanate. For example, 4,4'-MDI has a molecular weight of 250.26 and a functionality of 2 resulting in the isocyanate value, or % NCO groups, of 33.6.

The reaction of the polyisocyanate composition is then quenched. Generally, it has been known to quench the reaction with a very strong acid to prevent, inhibit, or retard continued reaction of the isocyanate groups over time and to prevent the continued formation of additional carbodiimide and uretonimine and uretonimine oligomers during storage of the composition. However, the addition of the very strong acid results in the uretonimine-modified composition becoming colored, typically yellow, orange, or brown. Other known processes for producing uretonimine-modified compositions also result in the composition becoming yellow, such as high reaction temperature with other catalysts. Any articles formed from the colored uretonimine-modified composition generally have the same color. If the article is to be a different color, additional amounts of pigment are necessary to overcome the prior color of the uretonimine-modified composition.

Formation of the uretonimine-modified composition according to the subject invention results in the composition having reduced or low color. It has been determined that dual quenching reduces the formation of the color in the uretonimine-modified composition. More specifically, dual quenching with a first quenching agent followed by a second quenching agent different than the first quenching agent is preferred. The first quenching agent partially quenches the reaction of the isocyanate groups to inhibit formation of carbodiimides thereby inhibiting formation of the uretonimine and uretonimine oligomers and the second quenching agent further quenches the reaction to further inhibit formation of carbodiimides thereby inhibiting additional formation of the uretonimine and uretonimine oligomers.

The addition of the first quenching agent occurs when the polyisocyanate composition is at a temperature of greater than about 80° C. Preferably, the first quenching agent is added as the polyisocyanate composition continues to react at a first temperature from about 80° C. to about 130° C. The temperature of the polyisocyanate composition is then reduced to a second temperature lower than the first temperature and the second quenching agent is added. Preferably, the second temperature is less than about 80° C. More preferably, the second temperature is in a range of from about 28° C. to about 75° C. Said another way, once the polyisocyanate composition has reached the second temperature in this range, the second quenching agent is added. The reduction of the temperature may occur by removing from a heat source or by active cooling as understood by those of skill in the art.

The dual quenching stages reduce the coloration of the uretonimine-modified composition. In this manner, the uretonimine-modified composition can be formed that is low color or nearly colorless. The advantages of a low color or nearly colorless composition are numerous. First, any articles formed therefrom will also be low color or nearly colorless allowing for a more aesthetically pleasing article that has many more uses. Second, if the article is to be colored, it is likely that lower amounts of pigments will be required since the base composition is nearly colorless.

In order to reduce coloration, the first quenching agent has a pKa greater than the second quenching agent. Preferably, the first quenching agent is a first acid or acid generator having a pKa of greater than about −8.0. It is to be appreciated by those of ordinary skill in the art that the term "acid generator" refers to compositions that are able to generate an acid when exposed to nucleophilic substances, such as water, amines, ureas, alcohols, etc. One example of an acid generator is benzoyl halide, which generates hydrochloric acid when exposed to nucleophiles.

The first acid or acid generator is selected from at least one inorganic acid, carboxylic acid, peroxides, sulfinic acid, sulfonic acid, sulfonic acid halides and carboxylic acid halides. It is to be appreciated that the first acid or acid generator may include a solvent for dispersing the acid or acid generator, such as diisodecyl adipate, diethyl malonate, or the like. Suitable examples of the first acid or acid generator include, but are not limited to, hydrochloric acid, methanesulfonic acid, toluenesulfonic acid, sulfuric acid, sulfonic acid, acetic acid, oxalic acid, citric acid, formic acid, ascorbic acid, benzoic acid, thiophenol, peracetic acid, benzoyl chloride, and mixtures thereof. For example, methanesulfonic acid has a pKa of about −2.6, benzoic acid has a pKa of about 4.2, and hydrochloric acid has a pKa of about −8.0.

The amount of the first acid or acid generator may depend upon the amount and the type of catalyst used to catalyze the reaction. However, it is preferred that the first acid or acid generator is present in an amount of from about 1 to about 500 parts per million based on the uretonimine-modified isocyanate composition. More preferably, the first quenching agent is present in an amount of from about 1 to about 100 parts per million based on the uretonimine-modified isocyanate composition.

The second quenching agent is also preferably a second acid or acid generator having a pKa of less than about −8.0. The second acid or acid generator is selected from at least one of trifluoromethanesulfonic acid and perchloric acid. It is to be appreciated that the second acid or acid generator may include a solvent for dispersing the acid or acid generator. Trifluoromethanesulfonic acid has a pKa of about −13 to about −14 and perchloric acid has a pKa of about −10. It is to be appreciated that other very strong second acids could also be used.

The second acid or acid generator is present in an amount of from about 1 to about 250 parts per million based on the uretonimine-modified isocyanate composition. Preferably, the second quenching agent is present in an amount of from about 1 to about 75 parts per million based on the uretonimine-modified isocyanate composition.

The following examples illustrate the production of the uretonimine-modified isocyanate composition, according to the subject invention and illustrating certain properties of the uretonimine-modified isocyanate composition, as presented herein, are intended to illustrate and not limit the invention.

EXAMPLES

A uretonimine-modified isocyanate composition is produced from a composition comprising the components according to Table 1 for Example 1 and Comparative Example A. The components that form the composition are listed in parts by weight, unless otherwise indicated.

TABLE 1

| 4,4'-MDI | 93.50 |
| 2,4'-MDI | 6.50 |

To a 1-L round-bottomed flask equipped with mechanical stirrer, 58.5 g Lupranate® MI Isocyanate (about 48 wt % 4,4'-MDI and 52 wt % 2,4'-MDI), commercially available from BASF Corporation, is charged under inert atmosphere and preheated to 60° C. Next, 591.5 g of Lupranate® M Isocyanate (about 98 wt % 4,4'-MDI and 2 wt % 2,4'-MDI), commercially available from BASF Corporation, and 0.0722 g of a 5% solution of phosphorene oxide catalyst in methyl ethyl ketone is added. The temperature is raised to about 105° C. and the reaction mixture is stirred for about 3.25 hours.

Next, Comparative Example A is prepared by transferring 100 g of the reaction mixture to a glass bottle preheated to about 105° C. and 0.0344 g of a 16.6% solution of trifluoromethane sulfonic acid (TFMSA) in diethyl malonate (Comparative Example A) is added to the glass bottle. The TFMSA is the strong acid used to deactivate the reaction. Two other 100-g samples are removed from the flask and are not further discussed.

Example 1 is prepared by adding 0.1644 g of a 23.51% solution of benzoyl chloride in diisodecyl adipate (the first quenching agent) to the 344 g of product remaining in the flask and heating is discontinued. When the product cools to about 40° C., 90 g of the product is transferred to a glass bottle containing 0.0317 g of a 16.6% solution of TFMSA in diethyl malonate (the second quenching agent).

Table 2 summarizes the color assessments for Comparative Example A and Example 1. The color of liquid isocyanate products are measured with a BYK Gardner Model LCSII Colorimeter. The Colorimeter measures color spectrophotometrically, in tristimulus values, either XYZ or CIE L*a*b* (CIELAB). The tristimulus values can be converted to a color measurement value in a wide variety of conventional color scales including the Platinum-Cobalt Scale, APHA, and yellowness index. The color of MDI uretonimine samples is reported in the APHA color scale and higher APHA values represent a darker yellow color.

TABLE 2

Color Assessment

| | Stage 1 catalyst Quenching Agent | ppm | Stage 2 catalyst Quenching Agent | ppm | APHA Color |
|---|---|---|---|---|---|
| Comparative Example A | TFMSA | 57.1 | — | — | 643 |
| Example 1 | Benzoyl chloride | 112.3 | TFMSA | 58.4 | 377 |

From Table 2, Comparative Example A has an increased APHA color over Example 1. Thus, Comparative Example A is a more darker yellow than Example 1.

Other uretonimine-modified isocyanate compositions are produced from a composition comprising the components according to Table 3 for Example 2 and Comparative Example B. The components that form the compositions are listed in parts by weight, unless otherwise indicated.

TABLE 3

| | Example 2 | Comparative Example B |
|---|---|---|
| 4,4'-MDI | 93.50 | 93.50 |
| 2,4'-MDI | 6.50 | 6.50 |

In Example 2, a 500-mL round-bottomed flask equipped with mechanical stirrer, heat mantle and digital temperature controller is preheated to 60° C. and charged with 358.7 g of Lupranate® M Isocyanate under inert atmosphere. Next, 0.0291 g of a 4.78% solution of phospholene oxide catalyst in γ-butyrolactone is added and the temperature is raised to 105° C. and the reaction mixture is stirred for about 3.5 hours. To the reaction mixture, 0.0465 g of a 12.45% solution of methanesulfonic acid (MSA) in diethyl malonate (the first quenching agent) is added and heating is discontinued. When the product temperature has fallen to 50° C., 0.1663 g of an 11.55% solution of TFMSA in diethyl malonate (the second quenching agent) is added. The intermediate % NCO is 28.88. Another 25.88 g of Lupranate® M isocyanate is added to bring the final % NCO of the product to 29.2.

In Comparative Example B, a 500-mL round-bottomed flask equipped with mechanical stirrer, heat mantle and digital temperature controller is preheated to 60° C. and charged with 309.7 g Lupranate® M Isocyanate under inert atmosphere. To this is added 0.3116 g triphenyl phosphite and 0.0341 g of a 5% solution of phospholene oxide catalyst in methyl ethyl ketone. The temperature is raised to 105° C. and the reaction mixture is stirred for 2.51 hours. Next, 0.0824 g of an 11.05% solution of TFMSA in diisodecyl adipate is added and heating was discontinued. When the product temperature had fallen to 50° C., an additional charge of 0.0560 g TFMSA solution is added. The intermediate % NCO value was 28.48. Another 50.23 g Lupranate® M Isocyanate was added to bring the final % NCO of the product to 29.2.

Similarly to Table 2, Example 2 and Comparative Example B underwent a color analysis using the colorimeter described above and the results are summarized in Table 4 below.

TABLE 4

Color Assessment

| | Stage 1 catalyst Quenching Agent | ppm | Stage 2 catalyst Quenching Agent | ppm | APHA Color |
|---|---|---|---|---|---|
| Example 2 | MSA | 16.4 | TFMSA | 55.1 | 276 |
| Comparative Example B | TFMSA | 30.3 | TFMSA | 20.4 | 567 |

Again, Example 2 formed from the dual stage process with the first quenching agent having a pKa greater than the second quenching agent has a lower APHA color than Comparative Example B. In other words, Example 2 has less color than Comparative Example B.

In addition to reducing and/or eliminating color, it is important that the catalyst present in the uretonimine-modified isocyanate composition is sufficiently deactivated. When the quenching agent does not adequately deactivate the catalyst, the stability of the uretonimine-modified composition decreases. Therefore, the combination of the first and the second quenching agents must adequately stabilize the uretonimine-modified isocyanate composition.

Table 5 illustrates the formation of uretonimine-modified isocyanate composition having employed the quenching agents as shown. The polyisocyanate composition is Lupranate® M isocyanate and the process used for preparing the uretonimine-modified isocyanate composition is similar to that used in Example 2 and Comparative Example 2. Compositions in Examples 2-7 were prepared using a first quenching agent and a second quenching agent. Comparative example C, D, and E were prepared using only a first quenching agent.

In order to determine stability, the following examples were subjected to an accelerated test. The accelerated test simulates the long-term storage stability of MDI-based uretonimine products at ambient temperatures. For each example, a sample of the uretonimine-modified isocyanate composition is placed in a sealed plastic container and then stored in an 80° C. oven for 7 days. At the end of the testing period, the % NCO of the sample is measured and compared with the initial (pre-test) % NCO value. The % decrease in % NCO value is the measure of product stability. Acceptable stability is defined as a decrease in % NCO of about 4% or less. Samples judged to be unstable generally had a decrease in % NCO of 6% or higher. In some cases, the sample gelled or solidified after the 7-day testing, which indicated the sample was extremely unstable. It is to be appreciated that it is deiseable for any uretonimine-modified isocyanate composition formed according to the invention to have a % NCO decrease of less than 6% for the shelf life of the product. The shelf-life may vary depending upon certain applications, but is likely to not exceed more than five years.

TABLE 5

| | Stage 1 (105°) | | Stage 2 (50°) | | % decrease in % NCO | Stability Test Result |
|---|---|---|---|---|---|---|
| | Quenching Agent | ppm | Quenching Agent | ppm | | |
| Example 3 | Benzoyl chloride | 108.5 | TFMSA | 64.5 | 2.4 | Pass |
| Example 4 | $H_2SO_4$ | 25.8 | TFMSA | 20 | 3.1 | Pass |

TABLE 5-continued

|  | Stage 1 (105°) | | Stage 2 (50°) | | % decrease in % NCO | Stability Test Result |
| --- | --- | --- | --- | --- | --- | --- |
|  | Quenching Agent | ppm | Quenching Agent | ppm | | |
| Example 5 | MSA | 17.5 | TFMSA | 25 | 3.0 | Pass |
|  |  |  |  | 35 | 3.2 | Pass |
|  |  |  |  | 50.5 | 2.7 | Pass |
| Example 6 | MSA | 15.9 | TFMSA | 30.8 | 2.9 | Pass |
| Example 7 | MSA | 18.1 | TFMSA | 47.1 | 3.6 | Pass |
| Comparative Example C | TFMSA | 51.5 | — | — | 3.2 | Pass |
| Comparative Example D | Benzoyl chloride | 108.5 | — | — | Sample gelled | Fail |
| Comparative Example E | MSA | 43 | — | — | 25.1 | Fail |

Examples 3-7 were formed with the first and second quenching agents and pass the stability test. Additionally, the % decrease in % NCO of these examples was as good as or better than the conventional uretonimine-modified isocyanate composition of Comparative Example C. The advantages of the subject invention over the traditional processing methods are evident in the lower color and equivalent or improved stability.

For reference, Comparative Examples D and E are given in which 100% of a weaker acid is used to deactivate the catalyst as the sole quenching agent. These examples failed the stability test indicating that a very strong catalyst deactivator is necessary to ensure long-term product stability.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of producing a uretonimine-modified isocyanate composition, said method comprising:
   providing a polyisocyanate composition having two or more isocyanate groups and comprising 4,4'-diphenylmethane diisocyanate (MDI);
   reacting the polyisocyanate composition at a first temperature in a range of from about 80° C. to about 130° C. and in the presence of a catalyst such that the isocyanate groups form carbodiimides available for forming uretonimines and uretonimine oligomers;
   partially quenching the reaction of the polyisocyanate composition with a first quenching agent having a pKa of greater than about −8.0 to inhibit formation of carbodiimides thereby inhibiting additional formation of uretonimine and uretonimine oligomers at the first temperature;
   reducing the temperature of the partially quenched reaction of polyisocyanate composition to a second temperature lower than the first temperature; and
   quenching the reaction of the polyisocyanate composition with a second quenching agent having a pKa of less than about −8.0 and different than the first quenching agent to further inhibit formation of carbodiimides thereby further inhibiting additional formation of uretonimines and uretonimine oligomers.

2. A method as set forth in claim 1 wherein the first quenching agent is a first acid or acid generator for reducing color.

3. A method as set forth in claim 2 wherein the first acid or acid generator is selected from at least one inorganic acid, carboxylic acid, peroxides, sulfuric acid, sulfuric acid, sulfuric acid halides and carboxylic acid halides.

4. A method as set forth in claim 2 wherein the first acid or acid generator is selected from at least one of hydrochloric acid, methanesulfonic acid, toluenesulfonic acid, sulfuric acid, acetic acid, oxalic acid, citric acid, formic acid, ascorbic acid, benzoic acid, thiophenol, peracetic acid, and benzoyl chloride.

5. A method as set forth in claim 2 wherein the first acid or acid generator is present in an amount of from about 1 to about 500 parts per million based on the uretonimine-modified isocyanate composition.

6. A method as set forth in claim 1 wherein the second quenching agent is a second acid or acid generator.

7. A method as set forth in claim 6 wherein the second acid or acid generator is selected from at least one of trifluoromethanesulfonic acid and perchloric acid.

8. A method as set forth in claim 6 wherein the second acid or acid generator is present in an amount of from about 1 to about 250 parts per million based on the uretonimine-modified isocyanate composition.

9. A method as set forth in claim 1 wherein the second temperature is in a range of from about 28° C. to about 75° C.

10. A method as set forth in claim 1 wherein the catalyst is selected from at least one of phospholene, phospholene oxide, phospholidine, phospholidine oxide, phosphate esters, and phosphine oxides.

11. A method as set forth in claim 1 wherein the first quenching agent is present in an amount of from about 1 to about 100 parts per million based on the uretonimine-modified isocyanate composition.

12. A method as set forth in claim 11 wherein the second quenching agent is present in an amount of from about 1 to about 75 parts per million based on the uretonimine-modified isocyanate composition.

13. A method of producing a uretonimine-modified isocyanate composition, said method comprising:
   providing a polyisocyanate composition having two or more isocyanate groups and comprising 4,4'-diphenylmethane diisocyanate (MDI);
   reacting the polyisocyanate composition in the presence of a catalyst such that the isocyanate groups form carbodiimides available for forming uretonimines and uretonimine oligomers;
   partially quenching the reaction of the polyisocyanate composition with a first quenching agent having a pKa of greater than about −8.0 to inhibit formation of carbodiimides thereby inhibiting additional formation of uretonimine and uretonimine oligomers; and
   quenching the reaction of the polyisocyanate composition with a second quenching agent having a pKa of less than about −8.0 and different than the first quenching agent to further inhibit formation of carbodiimides thereby further inhibiting additional formation of uretonimines and uretonimine oligomers.

14. A method as set forth in claim 13 wherein quenching the reaction of the polyisocyanate composition with the second quenching agent occurs at a temperature of less than about 80° C.

15. A method as set forth in claim 14 wherein partially quenching the reaction of the polyisocyanate composition with the first quenching agent is at a temperature of greater than about 80° C.

* * * * *